Sept. 29, 1931.  W. C. JOHNSON  1,824,898
LINED TANK OR PRESSURE VESSEL
Filed Jan. 31, 1930
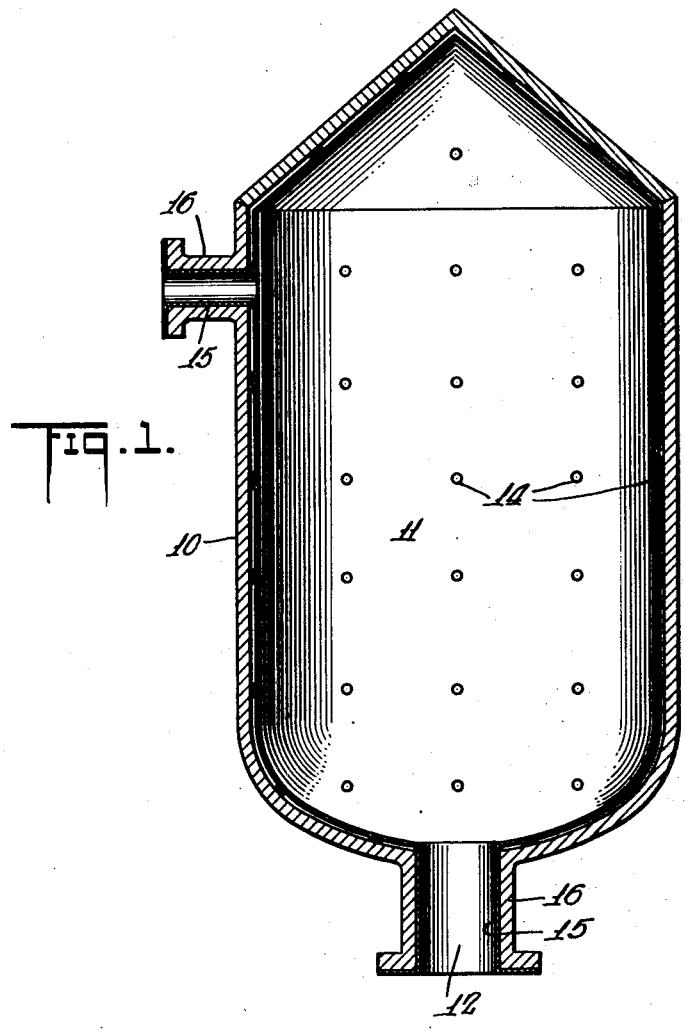
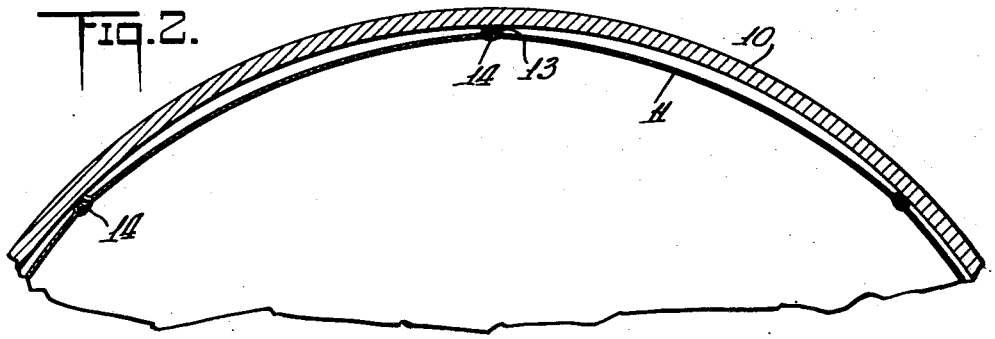
INVENTOR
*Wallace C. Johnson*
BY
ATTORNEY Patented Sept. 29, 1931

1,824,898

UNITED STATES PATENT OFFICE

WALLACE C. JOHNSON, OF EAST ORANGE, NEW JERSEY, ASSIGNOR TO INDUSTRIAL WELDED ALLOYS INC., OF NEWARK, NEW JERSEY, A CORPORATION OF DELAWARE

LINED TANK OR PRESSURE VESSEL

Application filed January 31, 1930. Serial No. 424,759.

This invention is an improvement in tanks or pressure vessels adapted for use in the treatment of fluids under high temperature and often under high pressure.

To sustain the high pressure employed in many chemical processes it is necessary that the walls of the tank or other vessel be so constructed as to provide the desired strength to resist internal pressure within the vessel. From a standpoint of economy this material should be as cheap as possible to provide the desired strength. Steel is best adapted for this purpose, but cannot be used without some form of liner if the vessel is to be used for any process in which a chemical is involved which will have a corrosive action on the steel or will be contaminated by contact with the steel.

Certain alloys are satisfactory so far as non-corrosive or non-tainting action is concerned, but due to the high cost of such alloys it is impractical to use such materials for the tank walls of a thickness sufficient to sustain the pressures employed in the chemical treatments carried on in the tank.

Difficulties are encountered in using a non-corrosive metallic liner in a steel tank subjected to a wide range of temperature and pressure conditions due to the marked difference in the coefficients of expansion of the main steel wall and the alloy liner. The liner will bulge inwardly at very high temperature and will shrink away from the wall at low temperature. Furthermore if the vessel be subjected to a very low vacuum the liner may pull away from the steel wall and collapse.

A construction which is highly satisfactory for many purposes is that disclosed in the Maskrey application Serial No. 313,398, filed Oct. 19, 1928.

In some few industries it is highly desirable that the liner of the vessel present a smooth surface free from any inwardly projecting portions.

The object of the present invention is to provide a construction in which the non-corrosive metallic liner is not only prevented from bulging, pulling away from the steel wall and from collapsing, but which at the same time presents a smooth inner surface which does not in any way obstruct the flow or movement of materials or agitating apparatus in the vessel and which permits the inner surface to be easily cleaned.

In carrying out my invention I provide a metallic liner in which expansion and contraction are confined to comparatively small separate areas. This is preferably accomplished by anchoring the liner to the main wall at points spaced lengthwise and circumferentially of the wall and by providing a slight clearance between the liner and the wall within the areas between the several anchoring points.

The anchoring is preferably accomplished by riveting or welding and it serves to prevent any collapsing of the liner under vacuum.

By holding the liner away from the tank wall in the areas between the rivets or welded points a relative contraction and expansion of the wall and liner may take place.

Under high pressure within the vessel the liner may stretch and press against the wall to produce a tension stress in the liner, but this will be limited by the contact of the liner with the wall after a small predetermined amount of stretching so that there is no danger of rupturing the liner. If the temperature of the liner increases it will tend to expand and produce a compression stress which will cause the separate segregated areas to move outwardly toward or into contact with the main wall. In most cases the temperature and pressure will rise simultaneously. These two stresses will tend to balance or neutralize each other and thus the liner will not be subjected to any serious strains tending to crack or permanently distort it.

In the accompanying drawings there is illustrated merely one embodiment of the invention, but it will be obvious that various changes may be made within the scope of my invention as defined in the appended claims.

In these drawings:

Fig. 1 is a central vertical longitudinal section of a tank constructed in accordance with my invention, and Fig. 2 is a transverse section of a portion of the wall and liner.

It will be obvious that my invention may be employed in tanks of various sizes, shapes and relative proportions and the main wall and liner may be made of various materials, thicknesses and designs in accordance with the character of the material to be treated and the range of temperatures and pressures to which it is subjected.

Merely as an example I have illustrated a tank which in practice might be 30 feet high by 8 feet in diameter and adapted to sustain a pressure of 250 pounds to the square inch through a temperature range of 350° F. In such a tank there is employed a main wall 10 preferably of steel with its heads welded or otherwise permanently connected to the peripheral wall. The heads may be of any desired shape and I have therefore illustrated a conical head at one end and a dished or concave head at the other.

The tank may have any suitable arrangement of inlets, outlets and/or manholes. There is provided a liner 11 which covers the entire inner surface of the tank as well as the inlet and outlet passages to the tank. This may be made of sections assembled and welded together and welded to the wall after the tank wall has been completed as the tank is provided with a manhole 12 of sufficient size to permit a workman to enter the tank.

In carrying out my invention the liner is made slightly smaller than the wall and very much thinner. Merely as an example the steel outer wall may be 3/4 of an inch in thickness while the liner may be approximately 1/8 of an inch in thickness. These thicknesses and spacings are shown very much exaggerated in the accompanying drawings to facilitate clearer illustration.

The liner is secured to the wall at a plurality of points which may be spaced apart to distances depending upon the amount of expansion and contraction to which the parts are subjected and the relative coefficients of expansion of the materials. For instance in a tank of the dimensions above referred to the anchoring of the liner to the wall may be at points spaced about 20 inches apart lengthwise and circumferentially of the tank. The anchoring may be accomplished by punching holes in the liner in such a way as to leave a slight burr or flange 13 encircling the hole upon the outer surface of the liner and by welding the liner to the wall by a plug 14 of non-corrosive alloy melted in place to completely close the hole in the liner and to permanently connect the liner to the wall through the hole. The liner is not only spaced from the wall at the anchoring points, but is preferably spaced to an even greater extent in the area between the anchoring points. For instance the wall itself may have a cylindrical inner surface while the liner may be slightly non-cylindrical to the extent that the portions between the anchoring points may be in arcs of slightly greater radius than that of the inner surface of the tank. Thus the liner may be spaced from the wall about 1/8 of an inch at the anchoring points and may be spaced about 1/16 of an inch midway between the anchoring points.

As previously noted all of these dimensions and proportions may be varied through comparatively wide limits depending upon the composition of the alloy lining, the spacing of the anchoring points, and the temperature and pressure to which the tank is to be subjected.

The end sections of the liner may be welded to the peripheral wall portion of the liner and each end may be spaced from and anchored to the ends of the tank wall in the same way as is the main or peripheral wall section of the liner.

At the inlet and outlet openings and manholes the liner may be welded to a tubular liner section 15 extending through bosses, pipe sections or manhole walls 16 which are bolted, riveted or welded to the main wall. These tubular liner sections for the inlets, outlets and manholes may be of such length that they also serve to maintain the liner slightly spaced from the wall at these points. They also serve to anchor the liner to the wall because the outer ends of the tubular sections 15 may be flanged or may be welded to the encircling strength providing bosses, collars or walls.

Having thus described my invention what I claim as new and desire to secure by Letters Patent is:

1. A tank or pressure vessel having a liner of corrosion resistant alloy anchored at a series of points spaced lengthwise and circumferentially of the vessel and spaced from the wall of the vessel at the points of anchorage.

2. A tank or pressure vessel having a liner of corrosion resistant alloy anchored at a series of points spaced lengthwise and circumferentially of the vessel and spaced from the walls in the areas between adjacent points of anchorage.

3. A steel tank or pressure vessel having a liner of corrosion resistant alloy presenting a substantially smooth inner surface, said liner having a plurality of compartively small openings therethrough and plugs of corrosion resistant alloy filling said openings and rigidly connecting the liner to the steel wall, said liner having flanges upon its outer surface encircling said openings and spacing said liner from said wall.

4. A tank or pressure vessel having a steel wall presenting a substantially cylindrical inner surface, and a liner of corrosion resistant alloy slightly non-cylindrical, said liner being spaced from and anchored to the wall at a plurality of points and spaced from the wall to a slightly greater distance in the areas between adjacent anchoring points.

Signed at Newark in the county of Essex and State of New Jersey this 27th day of January, A. D. 1930.

WALLACE C. JOHNSON.